W. FETZER.
DISK DRILL.
APPLICATION FILED AUG. 19, 1914.
1,299,160.
Patented Apr. 1, 1919.
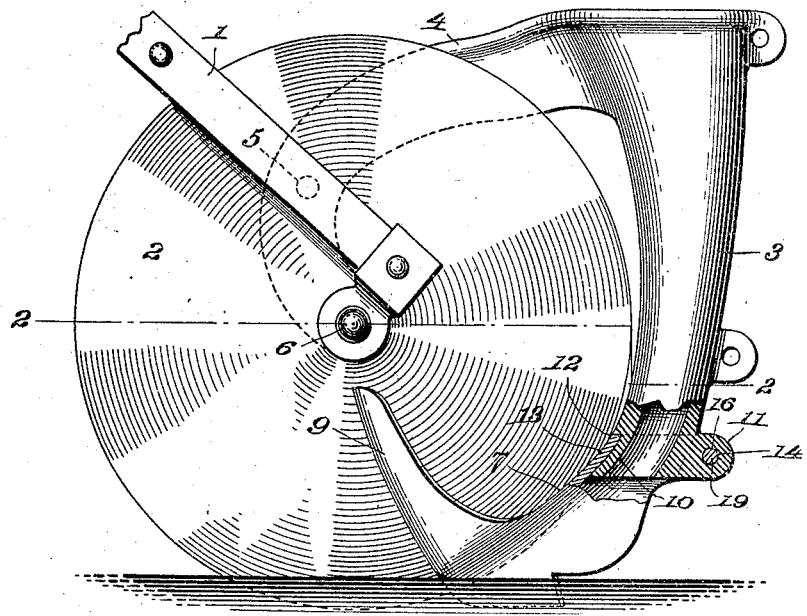
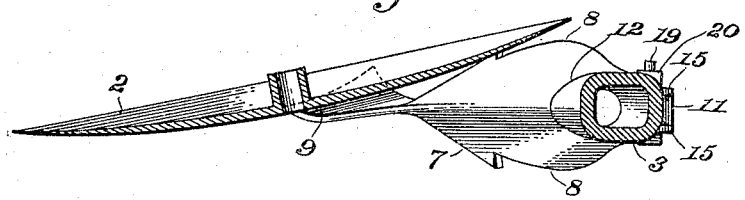
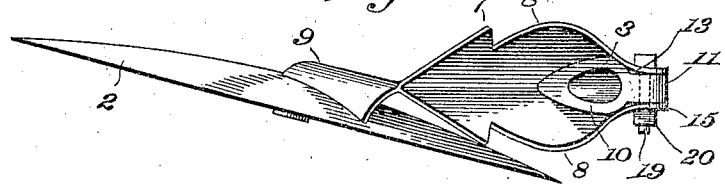
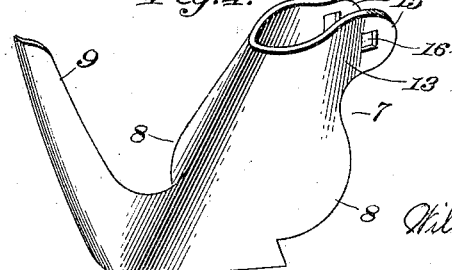
Witnesses:
Inventor:
William Fetzer.
By Bacon & Milans Atty's:

UNITED STATES PATENT OFFICE.

WILLIAM FETZER, OF SPRINGFIELD, ILLINOIS.

DISK DRILL.

1,299,160.  Specification of Letters Patent.  Patented Apr. 1, 1919.

Application filed August 19, 1914. Serial No. 857,543.

*To all whom it may concern:*

Be it known that I, WILLIAM FETZER, a citizen of the United States, residing at Springfield, in the county of Sangamon and State of Illinois, have invented certain new and useful Improvements in Disk Drills, of which the following is a specification, reference being had therein to the accompanying drawing.

This invention relates to improvements in disk drills and aims to provide an improved device of this nature adapted to produce a relatively wide seed bed or trench and to distribute the seed throughout the full width of the same.

An object of the invention is to provide improved means for enlarging the furrow formed by the drill disk, and means for distributing the seed within the furrow.

A further object of the invention is the provision of such means in a simple and practical form in and as a part of a seed boot structure.

The invention contemplates the use of a detachable disk scraper and also a seed boot construction, in which the lower part of the boot is detachable, and a still further object of the invention is to provide an improved construction for detachably connecting a scraper, or the lower portion of the seed boot to the main body portion thereof whereby the detachable parts will be firmly supported in operative position against lateral twisting or other movement relative to the main body part of the seed boot.

The invention, with other objects and advantages thereof, and the novel construction, combination and arrangement of parts comprising the same will be understood from the following detailed description when considered in connection with the accompanying drawings forming a part hereof and illustrating one embodiment of the invention.

In the drawings:

Figure 1 is a side elevation of a disk drill constructed in accordance with the present invention, Fig. 2 is a horizontal section on the line 2—2 of Fig. 1, Fig. 3 is a bottom plan of the disk and lower end of the seed boot, Fig. 4 is a detail perspective, on an enlarged scale of the furrow shaping and seed distributing means.

In the drawings, in which is illustrated by way of example a preferred embodiment of the invention, 1 designates a drag bar and supported on the drag bar for rotation is a disk 2. These parts may be of any well known or approved construction. 3 designates a seed boot, which is supported in any suitable manner. In the drawings the seed boot is shown as provided with a forwardly extending arm 4 connected to the drag bar by a bolt 5, the arm extending downwardly from this part and being connected with the axle 6 of the disk.

In accordance with my present improvements, the seed boot or tube is provided with a relatively broad forwardly and downwardly extending distributing end 7 comprising oppositely disposed angularly related share like portions or wings 8. The seed boot 3 is supported so that the broad delivery end 7 thereof is positioned to follow in the furrow formed by the drill disk and to extend to a depth substantially equal to the depth of the furrow formed by said disk.

In the operation of the device the drill disk pulverizes and opens up a furrow in the usual way. The broad delivery end portion 7, working in the pulverized soil and furrow prepared by the drill disk surface serves to reshape, enlarge and broaden the furrow at its base. It also serves to withhold the loose pulverized soil from falling back into the furrow until after the seed has been deposited therein. In this connection it will be noted that the portions or wings 8 extend well to the rear and in addition to their furrow shaping function also act to divert and distribute the seed into the seed bed or trench thus formed, the space between the portions or wings 8 forming a relatively broad seed outlet for the boot. Extending upwardly from the forward part of the broad delivery and furrow shaping end 7 of the seed boot is a scraper 9 for the drill disk 1, said scraper being curved as shown to engage the convex side of the disk and being adapted to keep the same free and to assist in opening the furrow.

I preferably form the furrow shaping and delivery and distributing means for the seed boot as a separate part, as illustrated in the drawings, and detachably connect the same to the main body portion of the boot so that said means can be readily removed when worn and a new part substituted or other parts used interchangeably therewith to suit the different conditions of the soil.

An important characteristic feature of the invention resides in the special connecting means provided whereby a strong rigid connection between the parts is afforded. The connecting means comprises the following construction. The main body portion 3 of the seed tube is provided with a reduced lower portion 10 and a lateral projection or lug 11. The lug preferably is positioned at the rear of the reduced portion near the top thereof, and a shoulder 12 extends around the upper end of the extension from each side of the said projection or lug. The part to be connected to the main body portion of the boot, in this instance, the part 7 has a tubular extension or neck 13 to snugly fit and embrace the reduced portion 10, with its upper end abutting the shoulder 12, the reduced portion being substantially elliptical shaped in cross section and the tubular neck portion correspondingly formed. The projection or lug 11 is provided with a bolt aperture 14, and the tubular extension or neck portion 13 is open at one end and provided with spaced extensions or ears 15 having bolt apertures 16, said extensions or ears when the tubular extension or neck portion 13 is fitted in place on the reduced portion 10 with its upper end in engagement with the shoulder 12 being adapted to extend coincidently with and fit against the projection or lug 11 with the bolt apertures 16 of the ears in alinement with the bolt aperture 14 of the projection or lug. A bolt 19 is passed through the apertures in the extensions or ears 15 and lug 11, and the parts firmly secured together by screwing up the clamp nut 20 on the end of the bolt.

It will be observed that this construction affords a very simple and efficient connecting means. The parts can be quickly attached and detached and when connected together are firmly held against movement relative to each other the shoulder 12 serving to prevent upward canting of the part 7, and the projection or lug 11 holding the part 7 against turning or twisting laterally, the substantially elliptical formation of the reduced portion 10 also serving to resist lateral play.

In the drawings I have illustrated a preferred embodiment of the invention and I desire it to be understood that minor changes and obvious modifications of the particular construction shown, within the scope of the appended claims may be made without departing from the broad principles of the invention.

What I claim is:

1. In a disk drill, the combination with an opening and pulverizing disk disposed at an angle to the line of draft, of a seed boot having a relatively broad delivery end portion comprising oppositely disposed rearwardly diverging share like parts, said delivery portion being adapted to work in the furrow formed by the disk to enlarge the same, the relatively broad end portion acting to withhold the soil from falling into the furrow until the seed is deposited therein and affording a relatively wide seed outlet for the boot to distribute the seed into the furrow throughout the full width of the furrow thus formed.

2. In a disk drill, the combination with an opening and pulverizing disk disposed at an angle to the line of draft, of a seed boot having a relatively broad lower end portion comprising oppositely disposed rearwardly diverging share like parts, said lower end portion being arranged to work in the furrow formed by the disk to enlarge the same at its base, the relatively broad lower end portion providing a relatively wide seed outlet for the boot, and a scraper secured to and extending upwardly from the forward end of said lower end portion.

3. In a disk drill, the combination with an opening and pulverizing disk disposed at an angle to the line of draft, of a disk boot provided with a spreader or widening base comprising oppositely disposed rearwardly diverging share portions having their adjacent edges joined together, and a scraper arranged forwardly of said base.

4. In a disk drill, the combination with an opening and pulverizing disk disposed at an angle to the line of draft, of a disk boot provided with a spreader or widening base comprising oppositely disposed rearwardly diverging share portions having their adjacent edges joined together, and a scraper extending forwardly from said base at a point where the share like portions adjoin each other.

5. In a disk drill, the combination with an opening and pulverizing disk disposed at an angle to the line of draft, of a disk boot, a metal piece for the disk boot constructed and arranged to form a two way plow bottom and having a scraper extending forwardly from the meeting point of the two sides thereof.

6. In a disk drill, the combination with an opening and pulverizing disk disposed at an angle to the line of draft, of a disk boot having widening wings at its base to widen the seed furrow and to make ledges or ridges at either side thereof, and a scraper for the disk extending forwardly from said base.

7. In a disk drill, the combination with an opening and pulverizing disk disposed at an angle to the line of draft, of a seed boot, and a metal piece for the seed boot having a shin and spreading wings extending from a common forward edge of the shin rearwardly in opposite diagonal directions from said shin, and a scraper extending forwardly from said shin.

In testimony whereof I hereunto affix my signature in the presence of two witnesses.

WILLIAM FETZER.

Witnesses:
Z. J. CUTLER,
I. C. RYAN.

Copies of this patent may be obtained for five cents each, by addressing the "Commissioner of Patents, Washington, D. C."